3,021,225
WATERPROOFING COMPOSITIONS
Erna Emilie Ziak, 14 Addison Gardens,
London W. 14, England
No Drawing. Filed Aug. 21, 1959, Ser. No. 835,177
Claims priority, application Great Britain Aug. 27, 1958
2 Claims. (Cl. 106—78)

The present invention relates to compositions for protecting stone, cement, plaster and similar substances from the effects of moisture, hereinafter referred to for simplicity as "waterproofing compositions."

According to the invention there is provided a waterproofing composition that includes curd soap, water, slaked lime and sodium silicate.

The preferred approximate range of percentage composition of a concentrated waterproof composition is as follows:

| | Percent by weight |
|---|---|
| Curd soap | 10 to 18 |
| Water | 28 to 40 |
| Slaked lime | 44 to 50 |
| Sodium silicate | 2 to 4 |

The actual quantities of materials may vary in dependence upon requirements. For example the following quantities give an example of a specific concentrated composition according to the invention:

| | | |
|---|---|---|
| Curd soap | kg | 1.40 |
| Water | litres | 3.75 |
| Slaked lime | kg | 5.00 |
| Sodium silicate | litre | 0.40 |

The quantity of soap, however, may be varied between 0.50 kg. and 2.50 kg. in the composition referred to above. Curd soap is sometimes referred to as "pure soap." Additionally, the sodium silicate content may vary from 0.20 litre to 0.60 litre, the water from 2 litres to 4 litres, and the slaked lime from 2.00 kg. to 7.00 kg. Sodium silicate is also referred to as "waterglass."

In making up a concentrated waterproofing composition according to the invention, the following procedure is adopted:

(1) The soap is shredded or flaked and stirred into some of the water which is preferably heated in a container, and then the remainder of the water is added whilst the mixture is still under heat, until the soap has been completely dissolved. If the water is cold the soap will take much longer to dissolve; it is therefore more practical to heat it.

(2) The dissolved soap and water mixture is then boiled and the slaked lime gradually added thereto. When thoroughly mixed the container is removed from the heat and the sodium silicate is added.

The result is a thick paste which can be marketed, without further modification, in suitable containers or wrapping material, such as metal drums or tins or strawboard or fibre containers, if necessary with a waterproof lining material such as a lining or bag of polythene.

For use, the paste is mixed with water and various dilutions will be found appropriate, depending upon the use to which the composition is to be put.

For example, the composition may be applied to walls, stone-work, plaster etc. that is already set, or may be added to cement, plaster and other liquid mixtures prior to making up or surfacing walls, ceilings and so on. Where the composition according to the invention is for use as a coating material on already-prepared walls and other surfaces, the strength is relatively weak, e.g. of the order of 1 part composition to 8 or 10 parts water. Where the composition is to be added to liquid mixtures for new building purposes, the strength is much higher, e.g. of the order of 1 part composition to 4 or 6 parts water.

I have also found that small quantities of barium sulphate and sodium phosphate may advantageously be added to the composition so far described, but this is not essential. These additions are so small as not substantially to interfere with the percentages referred to above. For example, the additions of these two extra materials may be of the order of 0.15 kg. of barium sulphate and 0.03 kg. sodium phosphate in the specific composition referred to above. However, these additional materials may vary from 0.05 to 0.25 kg. barium sulphate and 0.01 kg. to 0.05 kg. sodium phosphate.

Whilst the composition according to the invention has been referred to as a waterproofing material, I have found that it is also highly resistant to acids of the kinds normally met in domestic situations, for example sulphuric acid, nitric acid and hydrochloric acid, to name but a few. I do not claim, however, that the composition will resist all and every acid, nor that it is acid proof in the meaning that it is completely impervious to all acids known to man.

I claim:

1. A waterproofing composition consisting of proportionally 1.40 kg. curd soap, 3.75 litres water, 5.00 kg. slaked lime and 0.40 litre sodium silicate.

2. A waterproofing composition as claimed in claim 1, consisting additionally of from 0.05 to 0.25 kg. barium sulphate and from 0.01 to 0.05 kg. sodium phosphate.

References Cited in the file of this patent

UNITED STATES PATENTS

| 639,914 | Summers | Dec. 26, 1899 |
|---|---|---|
| 1,689,732 | Laucks | Oct. 29, 1923 |

FOREIGN PATENTS

| 124,850 | Australia | Oct. 13, 1944 |
|---|---|---|
| 12,251 | Sweden | June 9, 1900 |
| 112 of 1875 | Great Britain | Jan. 12, 1875 |
| 8,217 of 1884 | Great Britain | May 26, 1884 |
| 508,899 | Belgium | Feb. 29, 1952 |